(12) United States Patent
Shim et al.

(10) Patent No.: US 12,278,321 B2
(45) Date of Patent: Apr. 15, 2025

(54) APPARATUS FOR MANUFACTURING A CELL

(71) Applicant: LG ENERGY SOLUTION, LTD., Seoul (KR)

(72) Inventors: Hong Seok Shim, Daejeon (KR); Yoong Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 775 days.

(21) Appl. No.: 17/425,751

(22) PCT Filed: Feb. 20, 2020

(86) PCT No.: PCT/KR2020/002489
§ 371 (c)(1),
(2) Date: Jul. 26, 2021

(87) PCT Pub. No.: WO2020/180028
PCT Pub. Date: Sep. 10, 2020

(65) Prior Publication Data
US 2022/0052372 A1 Feb. 17, 2022

(30) Foreign Application Priority Data

Mar. 6, 2019 (KR) .......................... 10-2019-0025649

(51) Int. Cl.
*B23P 19/00* (2006.01)
*B65H 35/04* (2006.01)
(Continued)

(52) U.S. Cl.
CPC ........ *H01M 10/0404* (2013.01); *B65H 35/04* (2013.01); *G05D 23/193* (2013.01);
(Continued)

(58) Field of Classification Search
CPC ......... H01M 10/0404; H01M 10/0463; H01M 10/0585; H01M 50/46; B32B 37/0046;
(Continued)

(56) References Cited

U.S. PATENT DOCUMENTS 10,804,560 B2 * 10/2020 Lee ..................... H01M 50/609
2002/0007552 A1 1/2002 Singleton et al.
(Continued)

FOREIGN PATENT DOCUMENTS

JP 2013-122831 A 6/2013
JP 6247232 B2 12/2017
(Continued)

OTHER PUBLICATIONS

International Search Report (PCT/ISA/210) issued in PCT/KR2020/002489 mailed on May 26, 2020.
(Continued)

*Primary Examiner* — Paul D Kim
(74) *Attorney, Agent, or Firm* — Birch, Stewart, Kolasch & Birch, LLP

(57) ABSTRACT

Discussed is an apparatus for manufacturing a cell, the apparatus including: a center electrode reel from which a center electrode is to be unwound; a first heater configured to apply radiant heat to the unwound center electrode; an upper separator reel from which an upper separator to be laminated on a top surface of the center electrode is to be unwound; a lower separator reel from which a lower separator to be laminated on a bottom surface of the center electrode is to be unwound; an upper electrode reel from which an upper electrode to be laminated on a top surface of the upper separator is to be unwound; and a second heater configured to apply radiant heat to the unwound upper electrode.

8 Claims, 3 Drawing Sheets

(51) Int. Cl.
*G05D 23/19* (2006.01)
*H01M 10/04* (2006.01)
*H01M 10/0585* (2010.01)
*H05B 1/02* (2006.01)
*H05K 13/04* (2006.01)

(52) U.S. Cl.
CPC ........ *H01M 10/0585* (2013.01); *H05B 1/023* (2013.01); *B65H 2301/51432* (2013.01); *H05B 2203/005* (2013.01)

(58) Field of Classification Search
CPC . B32B 37/06; B32B 38/1833; B32B 2457/10; B32B 2309/105; G05D 23/193; B65H 35/04; B65H 2301/51432; H05B 1/023; H05B 1/0233; H05B 2203/005; Y02E 60/10; Y02P 70/50
See application file for complete search history.

(56) References Cited

U.S. PATENT DOCUMENTS

| | | | |
|---|---|---|---|
| 2013/0192750 | A1 | 8/2013 | Kiuche |
| 2014/0349192 | A1 | 11/2014 | Park et al. |
| 2016/0087284 | A1 | 3/2016 | Takagi |
| 2019/0027777 | A1 | 1/2019 | Lee |
| 2019/0044125 | A1 | 2/2019 | Park et al. |
| 2022/0006161 | A1* | 1/2022 | Kim ................... H01M 50/566 |

FOREIGN PATENT DOCUMENTS

| | | |
|---|---|---|
| JP | 6364853 B2 | 8/2018 |
| KR | 10-2013-0001264 A | 1/2013 |
| KR | 10-2015-0034944 A | 4/2015 |
| KR | 10-2015-0037210 A | 4/2015 |
| KR | 10-2015-0049576 A | 5/2015 |
| KR | 10-2016-0028730 A | 3/2016 |
| KR | 10-2016-0035967 A | 4/2016 |
| KR | 10-2016-0037672 A | 4/2016 |
| KR | 10-2016-0037673 A | 4/2016 |
| KR | 10-2017-0012930 A | 2/2017 |
| KR | 10-2018-0018139 A | 2/2018 |
| KR | 10-2018-0039561 A | 4/2018 |
| WO | WO 2018/070701 A1 | 4/2018 |

OTHER PUBLICATIONS

Extended European Search Report for European Application No. 20767262.7, dated Feb. 10, 2022.

* cited by examiner

APPARATUS FOR MANUFACTURING A CELL

CROSS-REFERENCE TO RELATED APPLICATION

The present application claims the benefit of the priority of Korean Patent Application No. 10-2019-0025649, filed on Mar. 6, 2019, which is hereby incorporated by reference in its entirety.

TECHNICAL FIELD

The present invention relates to an apparatus and method for manufacturing a cell, and more particularly, to an apparatus and method for manufacturing a cell, which improve bonding force between an electrode and a separator even though a laminate of the electrode and the separator increases in thickness and prevents the electrode and the separator from being separated from their regular positions during movement of the laminate by quickly performing temporary bonding.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In general, in order to manufacture the lithium secondary battery, first, electrode active material slurry is applied to a cathode collector and an anode collector to manufacture a cathode and an anode. Then, the electrodes are laminated on both sides of a separator to form a unit cell. In addition, unit cells are gathered to form an electrode assembly having a predetermined shape. Also, the electrode assembly is accommodated in a battery case, and then the battery case is sealed after an electrolyte is injected therein.

The unit cells include full-cells and bi-cells. Each of the full-cells is a cell in which a cathode and an anode are disposed at both of the outermost portions of the cell. As the most basic structure, the full-cell includes a full-cell having a structure of a cathode/separator/anode or a structure of a cathode/separator/anode/separator/cathode/separator/anode. Each of the bi-cells is a cell in which electrodes having the same polarity are disposed on both of the outermost portions of the cell. As the most basic structure, the bi-cell includes an A type bi-cell having a cathode/separator/anode/separator/cathode or a C type bi-cell having a structure of an anode/separator/cathode/separator/anode. That is, a cell in which a cathode is disposed at each of both of the outermost sides is referred to as an A-type bi-cell, and a cell in which an anode is disposed at each of both of the outermost sides is referred to as a C-type bi-cell.

In general, in order to manufacture such a unit cell, while a center electrode moves to one side by a conveyor belt or the like, a separator is laminated on each of top and bottom surfaces of the center electrode, and then, an upper electrode or a lower electrode is further laminated. When the laminate passes through a chamber, the laminate receives heat to come into a temporarily bonded state. Thereafter, a roller may press the laminate to manufacture the unit cell.

In recent years, more electrodes and separators are laminated from the beginning to a thicker laminate without laminating two or three unit cells after manufacturing the two or three unit cells by using the electrodes. Then, the laminate may pass through the chamber, and then, a roller may press the laminate to manufacture the cell. Alternatively, in order to manufacture a large-sized secondary battery, the thickness of the unit cell itself may be thick.

When the laminate in which the electrodes and the separator are laminated has a thick thickness due to various reasons as described above, even though the laminate passes through the chamber, heat may not be sufficiently transferred up to the inside, and thus, bonding force of an electrode active material may be deteriorated. Therefore, the electrodes and the separator may be delaminated, or energy efficiency may be deteriorated. Furthermore, the temporary bonding may be performed very slowly while the laminate moves and passes through the chamber. As a result, there may be a problem that the electrodes and the separator are separated from their regular positions while the laminate moves.

DISCLOSURE OF THE INVENTION

Technical Problem

An object of the present invention for solving the above problem is to provide an apparatus and method for manufacturing a cell, which improve bonding force between an electrode and a separator even though a laminate of the electrode and the separator increases in thickness and prevents the electrode and the separator from being separated from, their regular positions during movement of the laminate by quickly performing temporary bonding.

The objects of the present invention are not limited to the aforementioned object, but other objects not described herein will be clearly understood by those skilled in the art from descriptions below.

Technical Solution

An apparatus for manufacturing a cell according to an embodiment of the present invention for solving the above problem includes: a center electrode reel from which a center electrode is unwound; a first heater configured to apply radiant heat to the unwound center electrode; an upper separator reel from which an upper separator laminated on a top surface of the center electrode is unwound; a lower separator reel from which a lower separator laminated on a bottom surface of the center electrode is unwound; an upper electrode reel from which an upper electrode laminated on a top surface of the upper separator is unwound; and a second heater configured to apply radiant heat to the unwound upper electrode.

In addition, the apparatus may further include: a lower electrode reel from which a lower electrode laminated on a bottom surface of the lower separator is unwound; and a third heater configured to radiant heat the unwound lower electrode.

In addition, each of the first to third heaters may include a heating coil.

In addition, each of the first to third heaters may include a far infrared lamp (FIR Lamp).

In addition, the apparatus may further include: a first temperature sensor configured to measure a temperature of the center electrode; a second temperature sensor configured to measure a temperature of the upper electrode; a third temperature sensor configured to measure a temperature of the lower electrode; a storage unit in which a reference temperature is previously stored; and a control unit configured to control the first to third heaters.

In addition, the control unit may include: a comparison part configured to compare the measured temperature of each of the center electrode, the upper electrode, and the lower electrode with the reference temperature; and a heater adjustment part configured to adjust an intensity of each of the first to third heaters according to the results obtained by the comparison part.

In addition, the heater adjustment part may adjust the intensity of the first, second, or third heater so as to be strong when the temperature of the center electrode, the upper electrode, or the lower electrode is less than the reference temperature and may adjust the intensity of the first, second, or third heater so as to be weak when the temperature of the center electrode, the upper electrode, or the lower electrode is greater than the reference temperature.

In addition, the apparatus may further include a chamber in which convective heat is applied to a laminate in which the lower electrode, the lower separator, the center electrode, the upper separator, and the upper electrode are sequentially laminated.

In addition, the apparatus may further include a roller configured to press the laminate.

A method for manufacturing a unit cell according to an embodiment of the present invention for solving the above problem includes: a step of applying radiant heat to a center electrode unwound from a center electrode reel, an upper electrode unwound from an upper electrode reel, and a lower electrode unwound from a lower electrode reel; a step of cutting the center electrode, the upper electrode, and the lower electrode; a step of laminating a separator on each of both surfaces of the center electrode; and a step of laminating the upper electrode on the separator.

In addition, the method may further include, after the step of applying the radiant heat: a step of measuring a temperature of each of the center electrode, the upper electrode, and the lower electrode; and a step of adjusting an intensity of a first, second, or third heater so as to be strong when the temperature of the center electrode, the upper electrode, or the lower electrode is less than a previously stored reference temperature and adjusting the intensity of the first, second, or third heater so as to be weak when the temperature of the center electrode, the upper electrode, or the lower electrode is greater than the reference temperature.

Particularities of other embodiments are included in the detailed description and drawings.

Advantageous Effects

The embodiments of the present invention may have at least the following effects.

The electrode may be previously heated before the electrodes and the separator are laminated on each other to improve the bonding force between the electrodes and the separator event through the laminate increases in thickness.

In addition, since the temporary bonding is quickly performed, the electrodes and the separator may be prevented from being separated from their regular positions while the laminate moves.

In addition, when the electrodes are heated, the radiant heat using the far infrared rays may be applied, and thus, the metals of the peripheral facilities may not be heated.

The effects of the present invention are not limited by the aforementioned description, and thus, more varied effects are involved in this specification.

MODE FOR CARRYING OUT THE INVENTION

Figure 1:
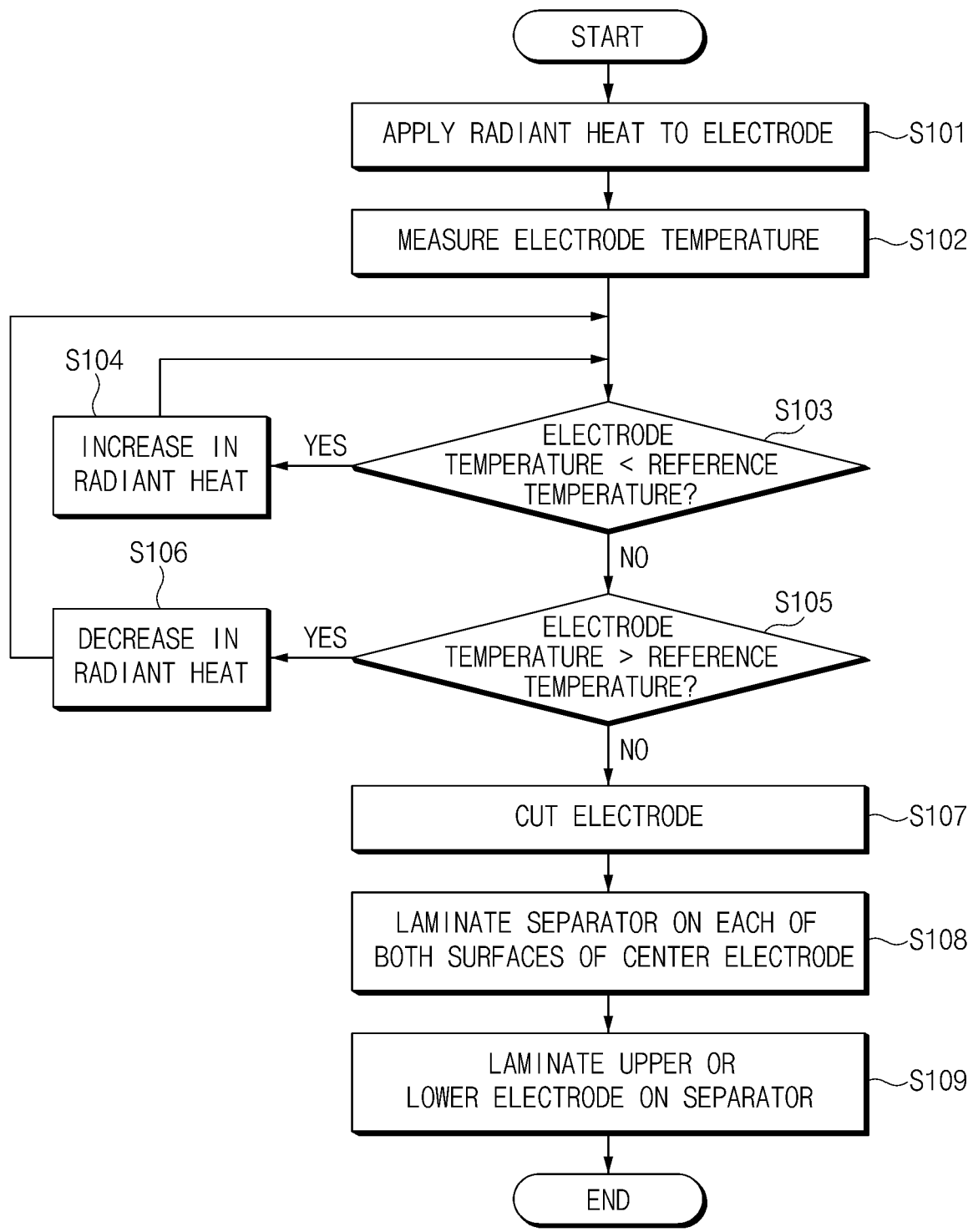
FIG. 1 is a flowchart illustrating a method for manufacturing a cell according to an embodiment of the present invention.

Advantages and features of the present invention, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

FIG. 1 is a flowchart illustrating a method for manufacturing a cell according to an embodiment of the present invention.

According to an embodiment of the present invention, electrodes 1111, 1121, and 1131 may be previously heated before the electrodes 1111, 1121, and 1131 and separators 1211 and 1221 are laminated on each other. Thus, even though a laminate 21 increases in thickness, bonding between the electrodes 1111, 1121, and 1131 and the separators 1211 and 1221 may be improved. In addition, since temporary bonding is performed quickly, the electrodes 1111, 1121, and 1131 and the separators 1211 and 1221 may be prevented from being separated from their regular positions while the laminate 21 moves.

For this, a method for manufacturing a cell according to an embodiment of the present invention includes: a step of applying radiant heat to a center electrode 1111 unwound from a center electrode reel 111, an upper electrode 1121 unwound from an upper electrode reel 112, and a lower electrode 1131 unwound from a lower electrode reel 113; a step of cutting the center electrode 1111, the upper electrode 1121, and the lower electrode 1131; a step of laminating a separator on each of both surfaces of the center electrode 1111; and a step of laminating the upper electrode 1121 on the separator. Also, after the step of applying the radiant heat, the method for manufacturing the cell may further include: a step of measuring a temperature of each of the center electrode 1111, the upper electrode 1121, and the lower electrode 1131; and a step of adjusting an intensity of a first, second, or third heater 141, 142, or 142 so as to be strong when the temperature of the center electrode 1111, the upper electrode 1121, or the lower electrode 1131 is less than a previously stored reference temperature and adjusting the intensity of the first, second, or third heater 141, 142, or 142 so as to be weak when the temperature of the center electrode 1111, the upper electrode 1121, or the lower electrode 1131 is greater than the reference temperature.

Hereinafter, each of the steps illustrated in the flowchart of FIG. 1 will be described with reference to FIGS. 2 and 3.

Figure 2:
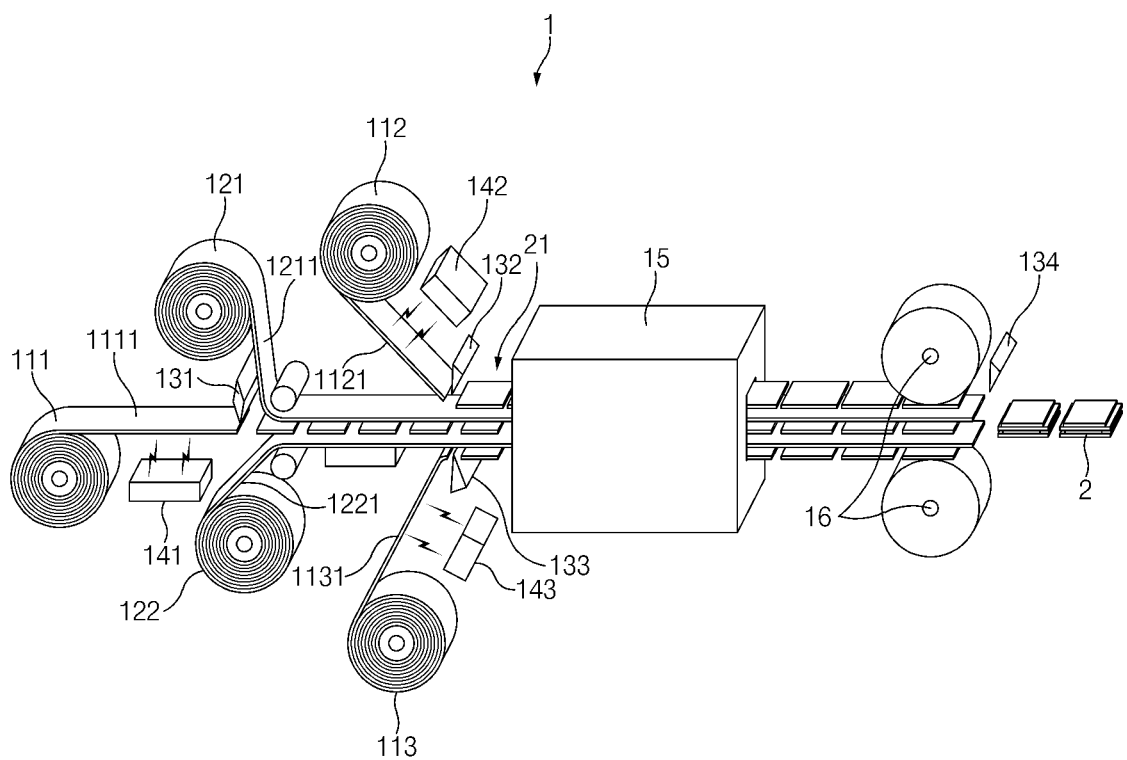
FIG. 2 is a schematic view illustrating an apparatus for manufacturing a cell according to an embodiment of the present invention.

FIG. 2 is a schematic view illustrating an apparatus 1 for manufacturing a cell according to an embodiment of the present invention.

As illustrated in FIG. 2, the apparatus 1 for manufacturing a cell according to an embodiment of the present invention includes: a center electrode reel 111 from which a center electrode 1111 is unwound; a first heater 141 applying radiant heat to the unwound center electrode 1111; an upper separator reel 121 from which an upper separator 1211 laminated on a top surface of the center electrode 1111 is unwound; a lower separator reel 122 from which a lower separator 1221 laminated on a bottom surface of the center electrode 1111 is unwound; an upper electrode reel 112 from, which an upper electrode 1121 laminated on a top surface of the upper separator 1211 is unwound; and a second heater 142 applying radiant heat to the unwound upper electrode 1121. Also, the apparatus 1 for manufacturing the cell may further include: a lower electrode reel 113 from which a lower electrode 1131 laminated on a bottom surface of the lower separator 1221 is unwound; and a third heater 143 heating the unwound lower electrode 1131.

As described above, a unit cell 2 is provided as one of a full-cell and a bi-cell. As described above, if the unit cell 2 is the bi-cell, the center electrode 1111 may be provided in an odd number, and if the unit cell 2 is the full-cell, the center electrode 1111 may be provided in an even number. When the apparatus 1 for manufacturing the cell according to an embodiment of the present invention is used, a unit cell 2 including two or three electrodes may be manufactured. However, the present invention is not limited thereto. For example, a cell in which more electrodes and separators are laminated may be manufactured.

The center electrode reel 111 may be a reel around which the center electrode 1111 is wound, and the center electrode 1111 may be unwound from the center electrode reel 111. Slurry of an electrode active material, a conductive material, and a binder may be applied on an electrode collector and then be dried and pressed to manufacture the electrodes 1111, 1121, and 1131.

The upper separator reel 121 and the lower separator reel 122 may be reels around which the separators 1211 and 1221 is wound, respectively. Also, the upper separator 1211 unwound from the upper separator reel 121 is laminated on the top surface of the center electrode 1111, and the lower separator 1221 unwound from the lower separator reel 122 is laminated on the bottom surface of the center electrode 1111. In general, slurry including a mixture of inorganic particles and a polymer binder may be applied on at least one surface of a porous polymer base material to form a porous coating layer, thereby manufacturing the separators 1211 and 1221. The porous polymer base material may include a polyolefin-based polymer.

The upper electrode reel 112 may be a reel around which the upper electrode 1121 is wound, and the upper electrode 1121 may be unwound from the upper electrode reel 112. The lower electrode reel 113 may be a reel around which the lower electrode 1131 is wound, and the lower electrode 1131 may be unwound from the lower electrode reel 113. If the unit cell 2 is the full-cell, the upper electrode 1121 and the lower electrode 1131 have different polarities. If the unit cell 2 is the bi-cell, the upper electrode 1121 and the lower electrode 1131 may have the same polarity and have polarity that is opposite to that of the center electrode 1111. If the bi-cell is the A type bi-cell, the center electrode 1111 is the anode, but each of the upper electrode 1121 and the lower electrode 1131 is the cathode. If the bi-cell is the C type bi-cell, the center electrode 1111 is the cathode, but each of the upper electrode 1121 and the lower electrode 1131 is the anode.

The upper electrode 1121 is laminated on a top surface of the upper separator 1211, and the lower electrode 1131 is laminated on a bottom surface of the lower separator 1221. As a result, a laminate 21 in which the lower electrode 1131, the lower separator 1221, the center electrode 1111, the upper separator 1211, and the upper electrode 1121 are sequentially laminated is formed.

The heater 14 applies radiant heat to the electrodes 1111, 1121, and 1131 and includes a first heater 141 applying radiant heat to the center electrode 1111, a second heater 142 applying radiant heat to the upper electrode 1121, and a third heater 143 applying radiant heat to the lower electrode 1131. Unlike convection or conduction, radiation does not transfer heat through a medium such as air or a metal, but is directly transferred through electromagnetic waves. In addition, radiant heat refers to heat that is converted when energy emitted in the form of electromagnetic waves from one object is transferred to the other object and absorbed. According to an embodiment of the present invention, each of the first to third heaters 141, 142, and 143 may include a heating coil.

In the electromagnetic waves that transmit radiant heat, infrared rays exhibit only a thermal effect, and thus, transfer efficiency of the radiant heat using the infrared rays may be excellent. The infrared rays are classified into near infrared rays (approximately 700 nm to approximately 1,200 nm), mid infrared rays (approximately 1,200 nm to approximately 2,500 nm) and far infrared rays (approximately 2,500 to approximately 8,000 nm) depending on wavelengths.

The far infrared rays have an excellent absorption rate with respect to glass and polymer materials. When the far-infrared rays reach a surface of glass, polymer materials, etc., resonance and resonance phenomena occur due to the polarity of the molecules to strongly amplify thermal energy inside the material. Thus, when far infrared rays are applied to the electrodes 1111, 1121, and 1131, the electrode active material may increase in temperature, and radiant heat may be sufficiently applied. On the other hand, the far infrared rays have a low absorption rate with respect to metals. The far infrared rays do not significantly affect metals. Thus, the temperature hardly rises even if the far infrared rays are irradiated to the metals for a long time. Therefore, the radiant heat may not be applied to peripheral facilities made of metals.

According to another embodiment of the present invention, each of the first to third heaters 141, 142, and 143 may include a far infrared lamp (FIR Lamp). Thus, since only the electrodes 1111, 1121, and 1131 are heated, and the metals of the peripheral facilities are not heated, malfunctions of the facilities may be prevented.

According to an embodiment of the present invention, before the electrodes 1111, 1121, 1131 and the separators 1211, 1221 are laminated on each other, the radiation heat is previously applied to the electrodes 1111, 1121, 1131 (S101). That is, the first heater 141 applies the radiant heat to the center electrode 1111, the second heater 142 applies the radiant heat to the upper electrode 1121, and the third heater 143 applies the radiant heat to the lower electrode 1131. As a result, even if the laminate 21 increases in thickness, bonding between the electrodes 1111, 1121, 1131 and the separators 1211, 1221 may be improved.

The apparatus 1 for manufacturing the cell according to an embodiment of the present invention may further include a chamber 15 in which convective heat is applied to the laminate 21, in which the lower electrode 1131, the lower separator 1221, the center electrode 1111, the upper separator 1211, and the upper electrode 1121 are sequentially laminated, and a roller 16 that presses the laminate 21.

The chamber 15 heats an inner space to allow air to increase in temperature. Thus, when the formed laminate 21 is put into the chamber 15, hot air in the inner space applies the convective heat to the laminate 21. Unlike the radiant heat, the convective heat refers to heat transferred from one object to the other object through a convective motion of a medium having the form of a fluid such as air or water. The laminate 21 put into the chamber 15 may receive convective heat to become in a temporarily bonded state. Then, the roller 16 may press the laminate 21 passing through the chamber 15 to manufacture the unit cell 2 as illustrated in FIG. 2.

According to an embodiment of the present invention, since the heater 14 heats the electrodes 1111, 1121, and 1131 by previously applying the radiant heat to the electrodes 1111, 1121, and 1131, the temporary bonding of the laminate 21 may be quickly performed to prevent the electrodes 1111, 1121, and 1131 and the separators 1211 and 1221 from being separated from their regular positions while the laminate 21 moves.

However, the present invention is not limited thereto, and a laminator may be provided instead of the chamber 15 and the roller 16. The laminator is constituted by an upper laminator and a lower laminator, which respectively apply heat and a pressure to top and bottom surfaces of the laminate 21 to perform lamination. Also, the electrodes 1111, 1121, and 1131 and the separators 1211 and 1221 of the laminate 21 may be bonded to each other through the lamination.

Figure 3:
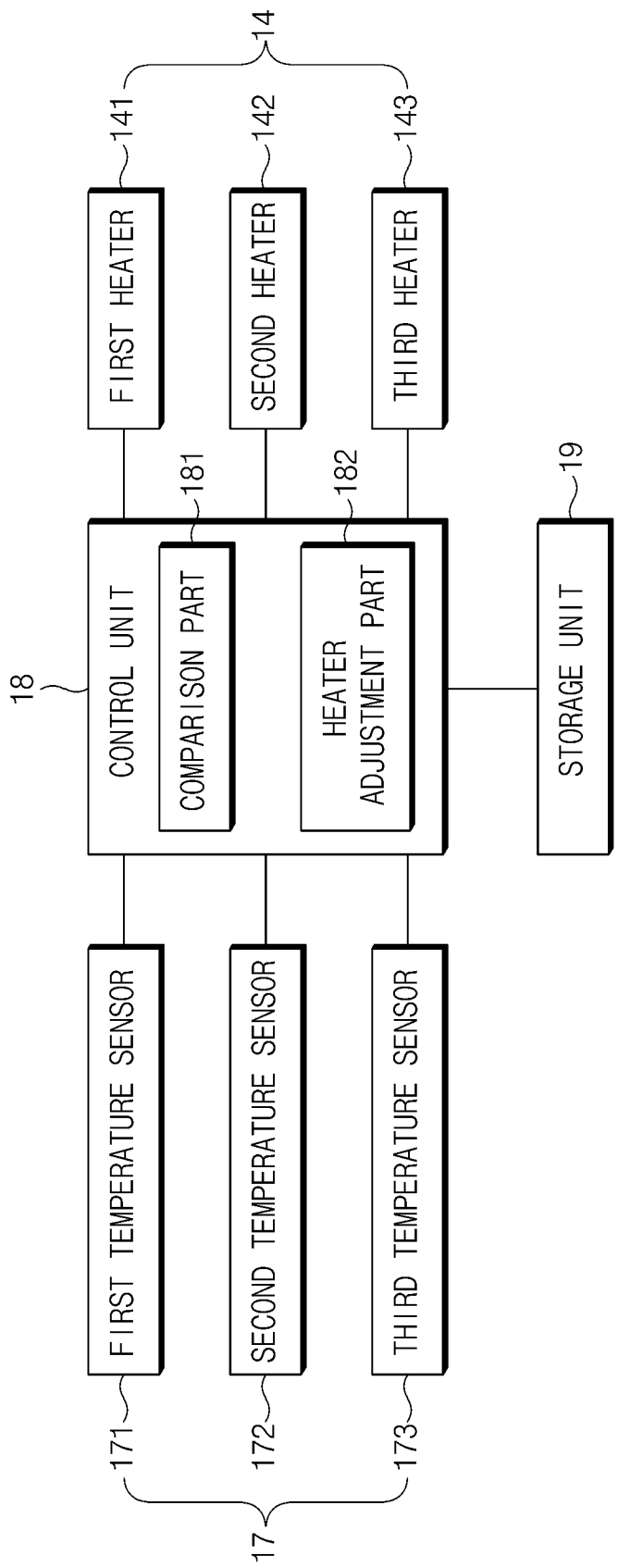
FIG. 3 is a block diagram illustrating the apparatus for manufacturing the cell according to an embodiment of the present invention.

FIG. 3 is a block diagram illustrating the apparatus for manufacturing the cell according to an embodiment of the present invention.

As illustrated in FIG. 3, the apparatus 1 for manufacturing the cell according to an embodiment of the present invention may further include: a first temperature sensor 171 measuring a temperature of the center electrode 1111; a second temperature sensor 172 measuring a temperature of the upper electrode 1121; a third temperature sensor 173 measuring a temperature of the lower electrode 1131; a storage unit 19 in which a reference temperature is previously stored; and a control unit 18 controlling the first to third heaters 141, 142, and 143. Also, the above-described components may be connected to each other to communicate with each other via a bus. All components provided in the control unit 18 may be connected to the bus through at least one interface or adapter or may be directly connected to the bus. In addition, the bus may be connected to other sub systems in addition to the above-described components. The bus includes a memory bus, a memory controller, a peripheral bus, and a local bus.

The temperature sensor 17 measures temperatures of the electrodes 1111, 1121, and 1131 to which the radiant heat is applied. That is, the first temperature sensor 171 measures a temperature of the center electrode 1111, the second temperature sensor 172 measures a temperature of the upper electrode 1121, and the third temperature sensor 173 measures a temperature of the lower electrode 1131 (S102). The temperature sensor 17 is classified into a contact type temperature sensor and a non-contact type temperature sensor. The contact type temperature sensor may measure a temperature in a contact manner in which the sensor directly contacts a target object to measure a temperature thereof when it is in a thermal equilibrium state, and the non-contact type temperature sensor may measure a temperature in a non-contact manner in which a temperature of a target object is measured by measuring an intensity of heat radiation emitted from the target object. Since the electrodes 1111, 1121, and 1131 are unwound from the electrode reels 111, 112, and 113 to move to one side, in order to prevent friction between the electrodes 1111, 1121, and 1131 and the temperature sensor 17 from occurring, it is preferable to measure the temperatures of the electrodes 1111, 1121, and 1131 in the non-contact manner. Examples of the non-contact type sensor include a radiation type sensor, an optical type sensor, and an infrared type sensor.

The storage unit 19 previously stores the reference temperature that serves as a reference for determining whether the electrode temperature is appropriate. The reference temperature refers to the most optimal temperature of the electrodes 1111, 1121, and 1131 before the electrodes 1111, 1121, and 1131 are laminated in the laminate 21. The reference temperature may be experimentally set according to a size of each of the electrodes 1111, 1121, and 1131, a composition of the electrode active material, the number of electrodes 1111, 1121, and 1131 to be laminated. It is preferable that the storage unit 19 is a nonvolatile memory device in which stored information is maintained without being volatilized even if power is not supplied. The nonvolatile memory includes a read-only memory (ROM), which representatively include PROM, EPROM, EEPROM, and the like, a hard disk (HDD), an optical disk (ODD), a solid state drive (SSD), and a flash memory.

The control unit 18 receives the temperature information of the electrodes 1111, 1121, and 1131 acquired by the temperature sensor 17 and adjusts the intensities of the first to third heaters 141, 142, and 143 according to the received information. The control unit 18 includes a comparison part (or a comparator) 181 and a heater adjustment part (or a heater adjustor) 182. It is preferable to use a central processing unit (CPU), a micro control unit (MCU), or a digital signal processor (DSP) as the control unit 18, but is not limited thereto. For example, various logical operation processors may be used.

The comparison part 181 compares each of the measured temperatures of the electrodes 1111, 1121, and 1131 with the reference temperature. That is, the comparison part 181 compares each of the temperature of the central electrode 1111, which is measured from the first temperature sensor 171, the temperature of the upper electrode 1121, which is measured from the second temperature sensor 172, and the temperature of the lower electrode 1131, which is measured from the third temperature sensor 173, with the reference temperature.

The heater adjustment part 182 adjusts the intensity of the heater 14 according to the results obtained by the comparison unit 181. Particularly, if the temperature of each of the electrodes 1111, 1121, and 1131 is less than the reference temperature (S103), the intensity of the heater 14 is adjusted to be strong so as to increase in radiant heat (S104), and if the temperature of each of the electrodes 1111, 1121, and 1131 is greater than the reference temperature (S105), the intensity of the heater 14 is adjusted to be weak so as to decrease in radiant heat (S106).

The heater adjustment part 182 may separately adjust the first to third heaters 141, 142, and 143. For example, if the temperature of the central electrode 1111 is less than the reference temperature, and the temperature of the upper electrode 1121 is greater than the reference temperature, the intensity of the first heater 141 may be adjusted to be strong, and the intensity of the second heater 142 may be adjusted to be weak.

After the radiant heat is applied to the electrodes 1111, 1121, and 1131, the electrodes 1111, 1121, and 1131 are cut (S107). That is, as illustrated in FIG. 1, a first cutter 131 cuts the central electrode 1111, a second cutter 132 cuts the upper electrode 1121, and a third cutter 133 cuts the lower electrode 1131. Also, the upper separator 1211 is unwound from the upper separator reel 121 and then is laminated on the top surface of the cut center electrode 1111, and the lower separator 1221 is unwound from the lower separator reel 122 and then is laminated on the bottom surface of the cut center electrode 1111 (S108). In addition, the cut upper electrode 1121 is laminated on the top surface of the upper separator 1211, and the cut lower electrode 1131 is laminated on the bottom surface of the lower separator 1221 to form a laminate 21 (S109). When the laminate 21 passes through the chamber 15, the laminate may receive heat to become in a temporarily bonded state. Thereafter, the roller 16 may press the laminate 21, and a fourth cutter 134 cuts the laminate 21 to manufacture the unit cell 2.

Each of the components of the apparatus 1 for manufacturing the cell, which are described so far, may be implemented with software such as tasks, classes, subroutines, processes, objects, execution threads, and programs, which are performed in a predetermined region in the memory, or hardware such as a field-programmable gate array (FPGA) or an application-specific integrated circuit (ASIC) and may also be implemented with a combination of the software and the hardware. The components may be included in a computer-readable storage medium, or portions of the components may be dispersed and distributed in a plurality of computers.

In addition, each block may represent a portion of a module, a segment, or a code that includes one or more executable instructions for executing a specified logical function(s). Also, in some alternative implementations, it is also possible that the functions mentioned in the blocks occur out of sequence. For example, it is possible that the two blocks shown in succession are actually executed at the same time in fact and also that the blocks are sometimes executed in the reverse order according to the corresponding function.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for manufacturing a cell, the apparatus comprising:
    a center electrode reel from which a center electrode is to be unwound;
    a first heater configured to apply radiant heat to the unwound center electrode;
    an upper separator reel from which an upper separator to be laminated on a top surface of the center electrode is to be unwound;
    a lower separator reel from which a lower separator to be laminated on a bottom surface of the center electrode is to be unwound;
    an upper electrode reel from which an upper electrode to be laminated on a top surface of the upper separator is to be unwound;
    a second heater configured to apply radiant heat to the unwound upper electrode;
    a lower electrode reel from which a lower electrode to be laminated on a bottom surface of the lower separator is to be unwound;
    a third heater configured to apply radiant heat to the unwound lower electrode;
    a first temperature sensor configured to measure a temperature of the center electrode;
    a second temperature sensor configured to measure a temperature of the upper electrode;
    a third temperature sensor configured to measure a temperature of the lower electrode;
    a storage unit in which a reference temperature is previously stored; and
    a control unit configured to control the first to third heaters.

2. The apparatus of claim 1, wherein each of the first to third heaters comprises a heating coil.

3. The apparatus of claim 1, wherein each of the first to third heaters comprises a far infrared (FIR) lamp.

4. The apparatus of claim 1, wherein the control unit comprises:
    a comparator configured to compare the measured temperature of each of the center electrode, the upper electrode, and the lower electrode with the reference temperature; and
    a heater adjustor configured to adjust an intensity of each of the first to third heaters according to comparison results obtained by the comparator.

5. The apparatus of claim 4, wherein the heater adjustor adjusts the intensity of the first, second, or third heater to increase when the temperature of the center electrode, the upper electrode, or the lower electrode is less than the reference temperature and adjusts the intensity of the first, second, or third heater to decrease when the temperature of the center electrode, the upper electrode, or the lower electrode is greater than the reference temperature.

6. The apparatus of claim 1, further comprising a chamber in which convective heat is applied to a laminate in which the lower electrode, the lower separator, the center electrode, the upper separator, and the upper electrode are sequentially laminated.

7. The apparatus of claim 6, further comprising a roller configured to press the laminate.

8. The apparatus of claim 1, further comprising:
    a first cutter to cut the central electrode;

a second cutter to cut the upper electrode; and
a third cutter to cut the lower electrode.

\* \* \* \* \*